May 31, 1932. J. L. ANDERSON 1,860,346

WELDED PIPE JOINT AND METHOD OF MAKING THE SAME

Filed Nov. 19, 1930

INVENTOR
James L. Anderson
BY J. F. Brandenburg
ATTORNEY

Patented May 31, 1932

1,860,346

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

WELDED PIPE JOINT AND METHOD OF MAKING THE SAME

Application filed November 19, 1930. Serial No. 496,585.

This invention relates generally to pipe joints between non-conforming sections, and to a method of formation thereof.

Herein will be considered the specific problem of joining two ordinary pipe sections, which meet at an angle, and wherein one section terminates at the intersection and communicates with the other section intermediately thereof, a joint commonly known as a T, or Y.

It has been the customary procedure in constructing such pipe joints to cut in the section which would form the cross-bar or main of the T or Y an opening according to a template, developed geometrically in accordance with the intersection of two cylinders of the respective diameters of the pipe sections. The end of the pipe section to be used for the upright member or branch was then cut according to a template, developed in a similar manner. The formed end of the branch was then positioned at the opening in the main to close it, and the seam thus formed was welded closed by any suitable process. In this method of construction it was necessary that the main be of a diameter the same as, or larger than, that of the branch pipe. If the main were slightly off-size and smaller than the branch, the efficiency of the welded seam would be materially reduced, if indeed the connection could be made.

It was also necessary in such constructions to position an edge surface of one member against a face surface of the other member. The connection between the sections could not be made by a butt-seam, since the edge surfaces of the two sections could not be brought directly into abutting or even into overlapping relation. The sections intersected substantially at right angles and the edge surfaces would therefore be positioned at right angles to each other.

As these pipe joints were made, the fluids in passing from one pipe section to its joined section had to negotiate a very sharp change in direction from the original path of flow. Abrupt surface changes within the pipe section were the rule of construction. Any effective graduation of these surface changes at the intersection to reduce the fluid friction has not been achieved in the past, by any inexpensive and practical method employing ordinary pipe, as far as I am aware. The angle of the edges at the welded intersection was sharp; the angle of flow past the intersection was sharp. Consequently in addition to the normal frictional resistance set up by the flow of fluids through such pipe, there had also to be considered the fact that the pipe at such junction was subjected to great pressure stresses, stresses which were of much greater magnitude than the normal static or kinetic pressures of the fluid. These stresses were due to the combined action of the static and kinetic forces upon the walls of the pipe at the joint as the fluid, flowing under pressure, was suddenly and sharply diverted into a new directional path. Furthermore, the seam where the branch approached closely the size of the main extended down to a position approximately that of the center line of the pipe. In any case, the seam consisted of a small area, forming a corner boundary between the surfaces of opposite disposition, such boundary in most cases being of fused metal having a strength less than that of the section body metal. The weakest portion of the pipe, the welded joint at the angle, being immediately at the point of directional change of the fluid, it necessarily resulted that pressures at which the main and its branch might be operated were limited to a very low factor of the parent metal strength.

In order to compensate for this weakness, the joint has in the past been strengthened by many different expedients to make it capable of withstanding the great stresses brought to bear thereon. Additional metal has been added at the welded seam to build up a stout external fillet. In some cases the walls of the branch pipe, at the prepared end thereof, were cut and a number of prongs formed. These prongs were then bent out from the body of the pipe section and into position to abut against the body of the main with which such branch pipe was to be assembled and thus to form braces for the branch. The prongs were welded to the body of the main pipe, sufficient metal being added to close the openings formed at the cut-outs and to provide a substantial fillet between the abutted surface and the edge. Likewise, braces distinct from the metal of the pipe sections, and welded or otherwise erected between the main and branch pipes, have been utilized.

Despite any strength added to the general assembly, such constructions left the inside surface of the connection with its sharp deviations as clearly defined as before. The pressure losses at the joint were therefore in no way affected, nor were the stresses created at such joint by the sudden change in direction in any manner reduced. The reinforced constructions used required considerable labor for their fabrication and resulted finally in cumbersome structure.

It is an object of this invention to provide a method of welding together pipe or tube sections and the products thereof wherein two sections intersect substantially at an angle, one section terminating at the intersection, and in which the sections may be of different diameters, the through or main section being of the same size, larger, or even slightly smaller than the branch section. While the word "diameter" is herein used, it is to be understood that the invention may also be applied to the assembly of pipe or tube of non-circular cross-section, as will hereinafter appear.

It is a further object of the invention in uniting sections in the manner hereinbefore set forth to construct the intersection of the sections so that the seam formed will be removed to a substantial degree from the location at which the greatest stresses are effective upon the pipe walls.

It is another object of the invention to construct the intersection aforesaid in such manner that there results in the passage of fluid from one section to another a smooth and gradual change of direction, with consequent reduction in fluid friction at such intersection.

It is further intended that the seam formed by the intersection of the two sections should be of such nature that substantially no continuous portion thereof lies in the plane of greatest metal strain, in order that if the seam should be weaker than the metal of the section walls no material portion thereof will be subjected to such consequent strain. This is accomplished by distributing the seam over an area of considerable latitude, giving it a form such that the stresses in the pipe walls when acting thereon would simultaneously find in the same plane of reaction a considerable portion of the parent metal of the pipe walls.

It is moreover an object of this invention to arrange the intersecting sections and the end edges thereof so that a true butt-seam or lap-seam may be produced. In the case of a butt-seam, a smooth interior surface is presented at the intersection, offering minimum resistance to the flow of fluids.

For these purposes the main pipe is formed with an opening in its wall and the end edge of the branch pipe is shaped to conform with this opening by a method closely resembling that utilized in former methods of joining such sections. However, in the present instance the edge of the opening and the end edge of the pipe section do not consist of smoothly curving lines, but comprise a plurality of long tentacles, preferably arranged according to a definite plan, so that the base lines and the vertices thereof follow predetermined paths. While it is preferred that the tentacles be shaped substantially as set forth in my Patent No. 1,450,935, dated April 10, 1923, that is, by having side edges disposed at an angle of substantially 45° to the mean seam line, this does not become an essential part of the invention for every application thereof, as the tentacles in a broad aspect of the invention may be any form of projection which permits the bending thereof into the desired contour as herein set forth. Nor is it always necessary, although generally desirable, that the tentacles have a regular arrangement or form.

The tentacles and intermediate recesses of one section are related to the tentacles and recesses of the associated member in such manner that by bending and similarly working the metal of the tentacles it is possible to arrange them to interlock. In such bending and forming operation, rounded surfaces are produced, and when the tentacles and recesses are interlocked and the seam thus formed is welded closed all portions of the seam will be disposed in lines following the direction of and not opposed to the line of greatest stress in the pipe wall, and will not be in any continuous, defined line along which the stresses may be effective.

Other objects of the invention will be apparent from the description herein and from the drawings herewith, or will specifically appear therein.

The invention is not intended to be restricted to the illustrative construction herein shown and described, nor to the specific methods herein set forth, nor to the precise steps or details thereof as the same may be modified in various particulars without departing from the spirit and scope of the invention, certain practical applications of which have been illustrated without attempting to show all the various forms and modifications in which the invention might be embodied.

On the drawings, in which is illustrated embodiments and applications of the invention:

Figure 3:
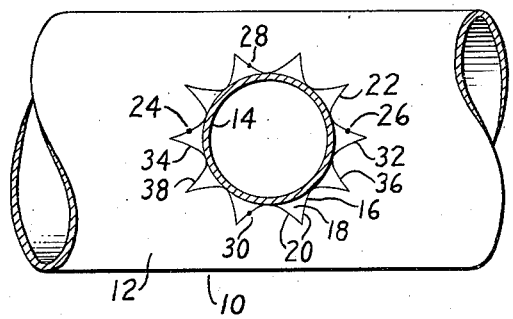
Fig. 3 is a plan view of a T-connection formed in accordance with the invention and in which the branch section is of smaller cross-sectional dimensions than the main section.
Figure 4:
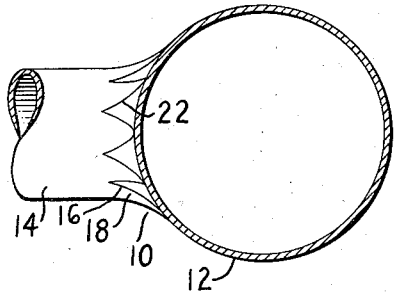
Fig. 4 is an end elevational view of the connection shown in Fig. 3.

In making a T-connection 10, as shown in Figs. 3 and 4 of the drawings, for the purpose of connecting to a main pipe 12 a branch pipe 14 of smaller diameter, it is useful first to prepare templates by means of which the pipe sections may be marked for cutting to the proper form for cooperation in the operations hereinafter set forth. For this purpose, the ordinary methods of development known to any draughtsman may be followed in a manner similar to that used in a connection with making templates for the normally used T-connection. However, in order to produce the serrated seam 16, it is now necessary to take into consideration factors in addition to those ordinarily presented in determining the lines of intersection of two cylinders. The prongs 18 on one section, when cut and finally shaped, must interlace with the recesses 20 on the opposed section in such manner that a smooth sweeping curve connects the two conduits.

It is possible to arrange the prongs and recesses so that, when interlocked, the curve produced will be of constant radius throughout the area of conjunction. Again, it is possible to form all the recesses and prongs of a single length. In the first case, if a smooth fillet is desired, it may become necessary to make the prongs and recesses of undesirable length. In the second case, to join the two sections may require bending of the metal to an undesirable extent and may result in the production of a comparatively sharp deviation, with some loss in the efficiency of the union.

It has, therefore, been found desirable to form the prongs and recesses in such manner as to utilize the meritorious features of these two cases. The particular lay-out of the prongs and recesses may be considered one of mechanical design after the relation of the two sections to each other has been determined and the contour at the intersection of the surfaces has been determined. Essentially, the invention requires the substitution for the continuous line seam previously used of a jagged toothed line along which the branch and the main are bonded together. Subject to such modifications as may be dictated by the considerations which have been indicated, it is preferred that the prongs should be as nearly of an equal base measure and that the side edges of the prongs should be disposed as nearly at 45° with the mean line of the seam as possible.

After the branch and main sections 14 and 12 have been marked, cutting thereof may be effected in any desired manner. In order to intermesh the prongs on one pipe section with the recesses on the other, the prongs on the two sections must be bent, or otherwise worked, outwardly until they assume a contour in which the prongs may be interlaced and form a substantially continuous surface. It is desired that the interlocking be accomplished by bringing the edge faces of the prongs on one member into abutment with edge faces of the prongs on the associated section.

The formation of the prongs, in the desired manner, may be effected by working on a mandrel, or by hand working, the prongs 18 at the end of the branch pipe being bent outwardly so that they will interlock with the recesses between the similar prongs about the opening 22 in the main. The latter prongs must first, in any preferred manner, such as by hand-hammering, be bent upwardly, away from the body of the pipe, as appears in Fig. 4.

After proper relative positioning has been effected, in which the edge faces of the prongs are disposed in substantially accurate abutment, or if desired in overlapping relation, welding of the seam formed may be executed in the manner set forth in my patent referred to above. In this operation, however, it is necessary to consider that rounded and not plane surfaces are being dealt with. For this reason, the following procedure is preferably followed. After the two sections have had their respective prongs and recesses interlocked, the sections are first tacked together at selected points so that they will remain anchored together during the subsequent welding operation. A tack weld is first made intermediately of one of the distinct seam lines, as at 24. Simultaneously with such tacking operation, or immediately thereafter, a similar tack is effected intermediately of a line 26 disposed substantially diametrically opposite the first line 24. Immediately thereupon, two other tacks are made on lines 28 and 30, located about 90° removed from each of the first made tacks. It is to be noted, in this connection, that the first and second tacks, and each subsequent pair, are made at pairs of lines which are oppositely disposed relatively to the mean line of the seam, in order that the effect of the expansive and contractive stresses, created by such welding operation, will tend to neutralize, rather than aggravate, each other. In this manner possible distortion of the prongs and recesses is reduced to a minimum, or is eliminated. Also, by tacking alternately at diametrically opposed positions, the distortion which naturally arises from such expansive and contractive stresses is, at each consecutive tacking operation, counteracted and counterbalanced.

Now the seam is welded closed completely by fusing the tacked edges to unite them along converging prong edges. For instance, the V-seam formed by the intersection of lines 26 and 32 is fused closed beyond the tacked points. Welding of the V between lines 24 and 34 beyond the tacked points is next effected, welding of the other V's then following in a manner similar to that designated for the tacking operation.

It may be desired in this connection to weld up those V's which are disposed on one side of the mean seam line before commencing upon those on the other side, in order to reduce to a minimum the action of forces created by the welding heat. Such V's as that formed by lines 32 and 36, 34 and 38, and the like may therefore be left for welding until after the V's formed by such lines as 32 and 26 have been completely welded. The relatively ductile tongues of the prongs during the welding steps set forth are subjected to the expansive and contractive stresses; and because of their relatively small metallic content, they respond to such stresses easily, reducing the possibilities of rupture. Reheating, after all the lines have been completely closed, may be resorted to in order further to reduce the contractive tensile stresses.

Figure 1:
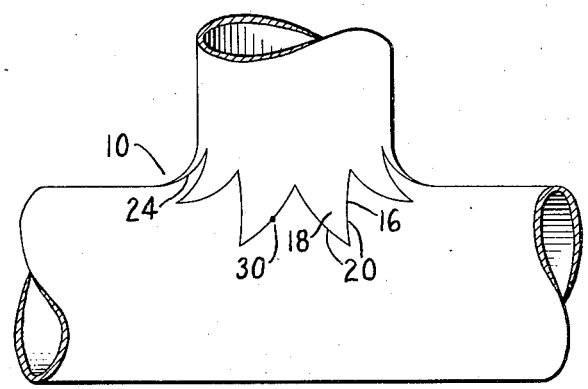
Fig. 1 is a side elevational view of a T-connection, formed by two sections of substantially the same cross-sectional dimensions, the connection embodying the invention.
Figure 2:
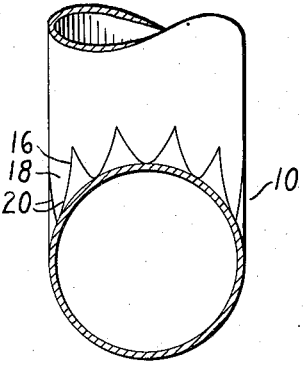
Fig. 2 is an end elevational view of the connection shown in Fig. 1.

In making connections of this character between pipe sections of the same diameter, as shown in Figs. 1 and 2, substantially the same method is resorted to throughout. However, in uniting a main section with a branch section of slightly larger diameter, it will be necessary to arrange the prongs on that portion of the branch section which projects beyond the main section so that they bend slightly inward, rather than outward, whilst the corresponding prongs on the main section bend slightly outward.

Due to the flexibility of assembly provided by the method herein, pipe sections not having a true circular cross-section may be united in the manner above set forth. The method may also be employed in uniting a branch pipe to a main pipe where the meeting angle is not a true right angle, thus forming a Y connection. The structural elements and the steps of the process are essentially similar to those followed in the production of the T.

A further advantage of the invention is that these welded joints between pipe sections in angular relation to each other can be produced without resulting in bowing the main.

I claim:

1. The method of making a permanent connection between two pipe sections, which includes: forming an opening intermediately of one section, forming the edges of said opening with a plurality of alternate indentations and projections, providing an open end of the other section with complementary indentations and projections, working the projections and projections on each of said sections to such relation as to interlock with the indentations on the associated section and form a seam consisting of diagonals crossing the center line of the seam in alternately angularly disposed relation, tacking the sections together at consecutive pairs of diametrically oppositely disposed diagonals, oppositely angularly disposed relatively to said center line, and midway of each diagonal, and welding the seam closed by fusing all pairs of intersecting edges, disposed on one side of the center line, from the tacked points to the point of intersection, and then all pairs disposed on the other side of the line.

2. The method of making a permanent connection between two pipe sections, which includes: forming an opening intermediately of one section, forming the edges of said opening with a plurality of alternate indentations and projections, providing an open end of the other section with complementary indentations and projections, working the projections on each of said sections to such relation as to interlock with the indentations on the associated section and form a seam consisting of diagonals crossing the center line of the seam in alternately angularly disposed relation, tacking the sections together at consecutive pairs of diametrically oppositely disposed diagonals, oppositely angularly disposed relatively to said center line, and midway of each diagonal, and welding the seam closed by fusing pairs of intersecting edges from the tacked points to the point of intersection.

3. A branch pipe connection including: a main pipe, a branch pipe for connection to said main pipe, said main pipe having an opening formed in the walls and intermediately thereof, a plurality of projections from the edge of said opening, and a plurality of projections from an end edge of said branch pipe, the respective projections being bent away from the body metal of said main and branch pipes, respectively, so that they interlock and being welded together to form a continuous pipe wall.

4. A branch pipe connection including: a main pipe, a branch pipe for connection to main pipe, said main pipe having an opening formed in the walls and intermediately thereof, and an end edge of said branch pipe being united with said main pipe at said opening along a butt welded seam which crosses and recrosses a mean intersection line of said pipes, the joint between the sections being formed by series of fingers cut and bent from the walls of the sections so as to interlock.

5. A pipe construction comprising two pipe sections one of which meets the other intermediate its ends at an angle, the meeting portions of said pipe sections having series of tapering tongues and intervening indentations, the tongues being flexed from the lines of the pipe sections and interlocked to form smooth and gradual lines of confluence from one pipe section to the other, and a fused butt joint uniting the edges of the tongues and indentations.

6. The method of making an integral pipe connection between non-conforming sections, which comprises cutting one pipe section so as to provide a series of tapering tongues and indentations, cutting the end of another pipe section to provide a series of tapering tongues and indentations, said tongues and indentations being of predetermined form and proportions, so that the tongues can be worked to curvatures giving smooth lines of confluence from one section to the other and can then interengage, curving the tongues and interengaging them, and butt welding the joint thus formed.

JAMES L. ANDERSON.